Figure 1:
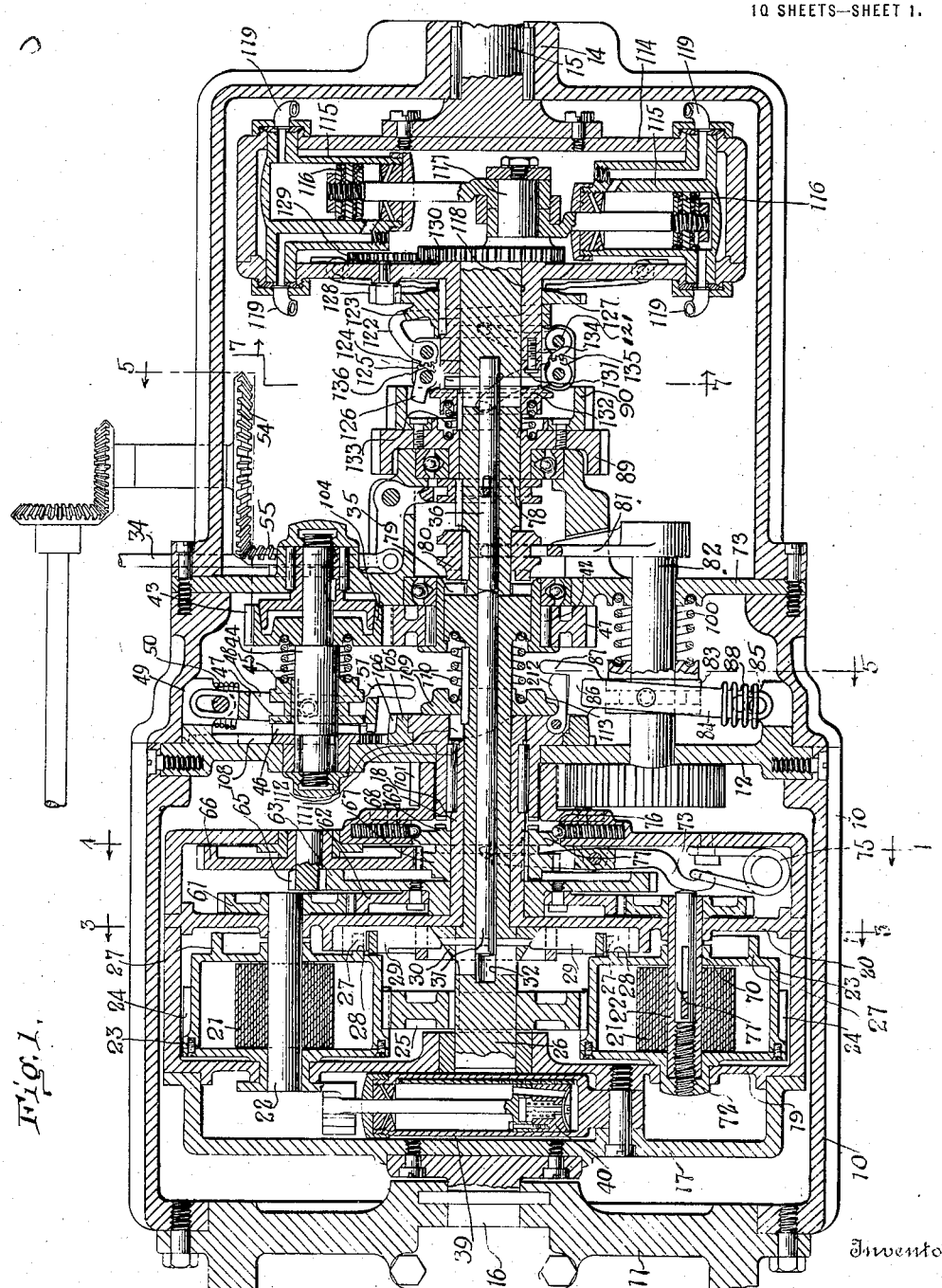

V. E. RUMBARGER.
CONTROLLING DEVICE FOR MOTOR DRIVEN VEHICLES.
APPLICATION FILED FEB. 9, 1914.

1,175,380.

Patented Mar. 14, 1916.
10 SHEETS—SHEET 1.

Witnesses

Inventor
Victor E. Rumbarger,
By
Attorneys

V. E. RUMBARGER.
CONTROLLING DEVICE FOR MOTOR DRIVEN VEHICLES.
APPLICATION FILED FEB. 9, 1914.

1,175,380.

Patented Mar. 14, 1916.
10 SHEETS—SHEET 7.

Fig. 7.

Inventor
Victor E. Rumbarger,

Witnesses

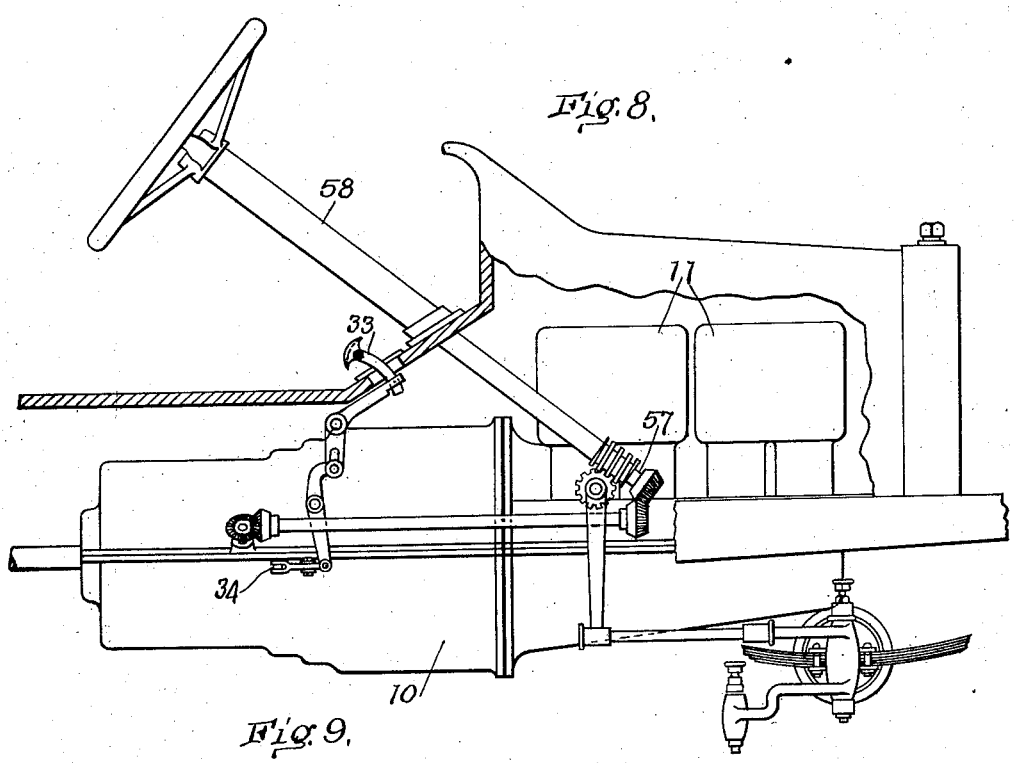
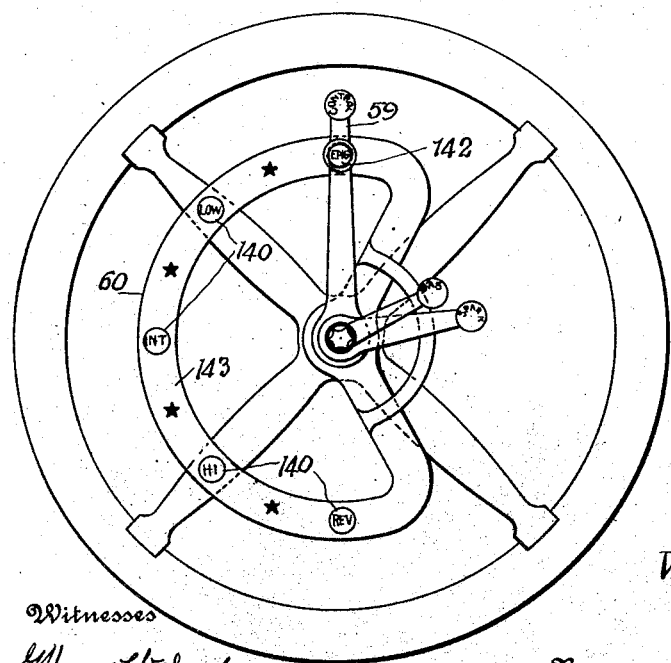
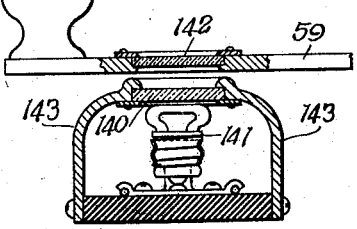

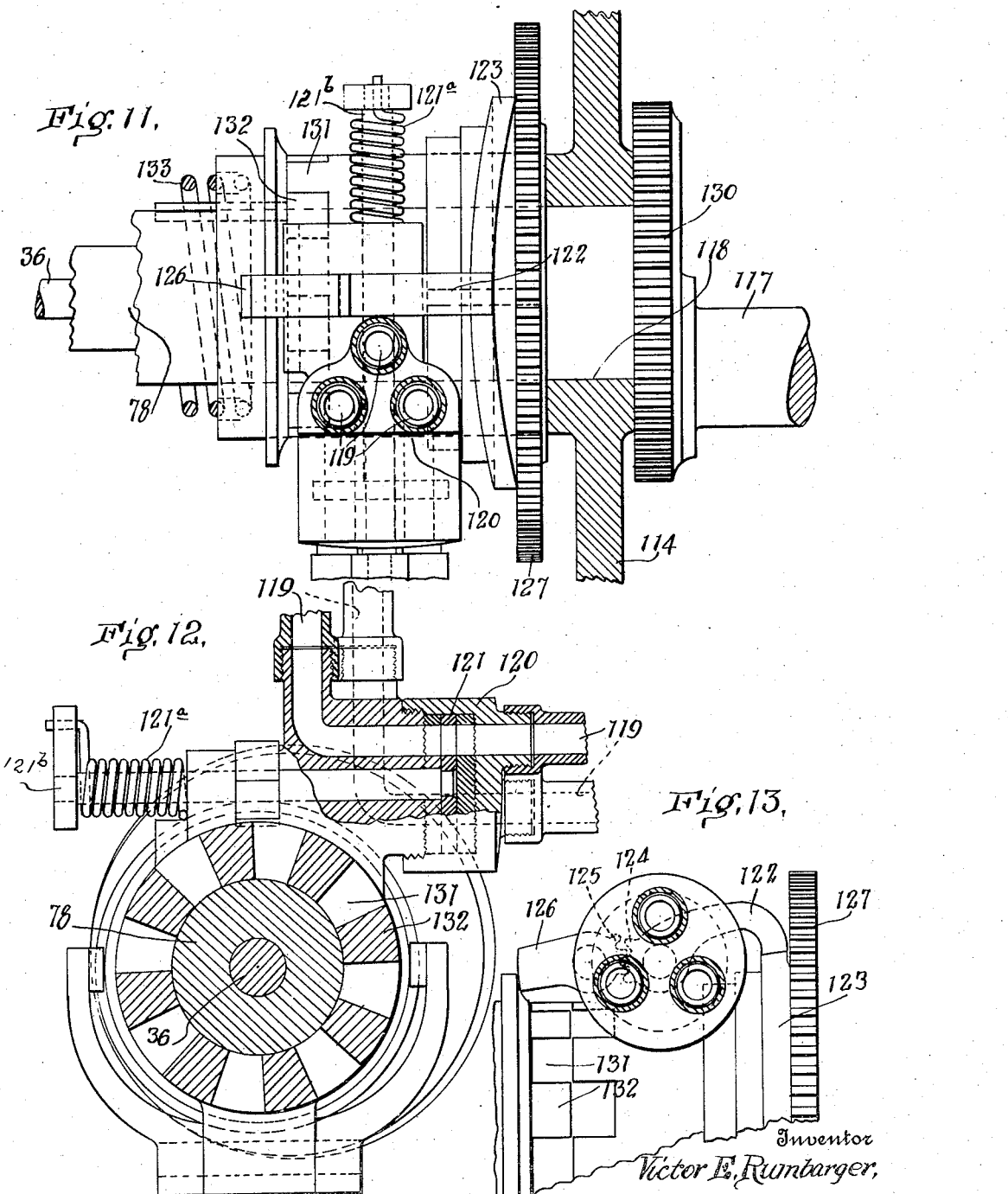

V. E. RUMBARGER.
CONTROLLING DEVICE FOR MOTOR DRIVEN VEHICLES.
APPLICATION FILED FEB. 9, 1914.
1,175,880.
Patented Mar. 14, 1916.
10 SHEETS—SHEET 10.
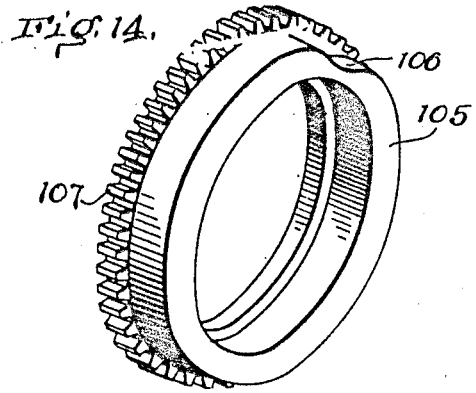
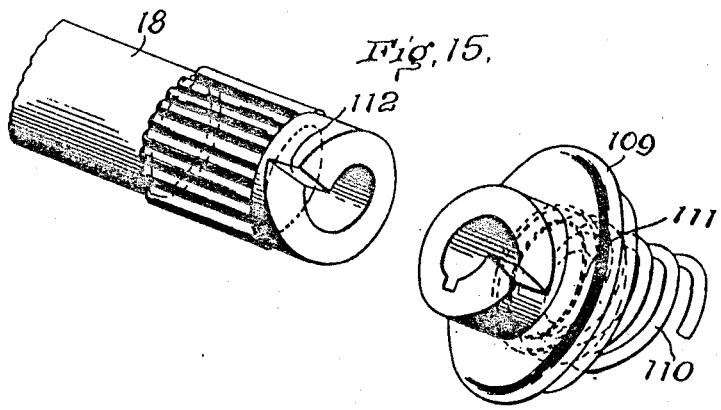
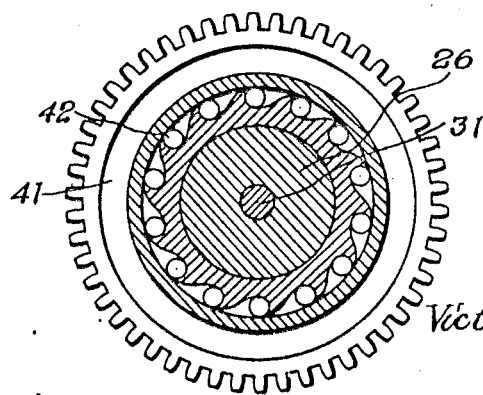
Inventor
Victor E. Rumbarger,
Witnesses
Attorneys

UNITED STATES PATENT OFFICE.

VICTOR E. RUMBARGER, OF DAYTON, OHIO.

CONTROLLING DEVICE FOR MOTOR-DRIVEN VEHICLES.

1,175,380.  Specification of Letters Patent.  Patented Mar. 14, 1916.

Application filed February 9, 1914. Serial No. 817,568.

*To all whom it may concern:*

Be it known that I, VICTOR E. RUMBARGER, a citizen of the United States, residing at Dayton, in the county of Montgomery and State of Ohio, have invented certain new and useful Improvements in Controlling Devices for Motor-Driven Vehicles, of which the following is a specification, reference being had therein to the accompanying drawing.

This invention relates to controlling devices for motor driven vehicles.

In starting the ordinary automobile or in changing it from one speed to another, it is necessary, first, to disconnect the transmission gearing from the engine, shift the proper gears out of and into mesh and then reconnect the transmission gearing with the engine. This operation is a difficult one to accomplish in a satisfactory manner even by one skilled in the driving of an automobile, consumes considerable time and unless the clutch is very carefully manipulated in connecting the transmission gear with the engine after the gears have been shifted there will be more or less of a jerk or shock as the machine starts into motion or jumps from one speed to another. This jerk is not only annoying to the passengers in the car but also strains the machinery. Further, the time required to manipulate the clutch and then the gear shifting lever makes it difficult to change quickly from one speed to another or to reverse in an emergency.

The main object of the present invention is two-fold. First, it is the purpose of the invention to provide a mechanism for controlling the transmission of power from the engine to the driving wheels which will be automatic in its operation, it being only necessary for the driver to set a selector in the necessary position, which can be done at any time, and then when he is ready to make the change in the gearing, to manipulate a single controlling lever which causes the necessary change in the transmission of power; and to so construct the mechanism that this change in the transmission will be made without moving the gears into or out of mesh. The second purpose of the invention is to provide a yielding connection between the transmission devices and the driving wheels, which connection will permit the movement of the transmission devices relatively to the driven member but which will resist this relative movement in such a manner as to cause the driven member or wheels to be rotated to a greater or lesser extent according to the amount of resistance offered by the yielding connection; and to so control this resistance that when movement is first imparted to the transmission devices or the transmission devices are manipulated to change from one speed to another little or no resistance will be offered to the movement of the transmission devices by the yielding connection; and to automatically increase this resistance until the maximum of resistance has been offered to the movement of the transmission devices relatively to the driving wheels and then to introduce a positive connection between the transmission devices and the driving wheels, whereby the yielding connection is utilized only in starting or in changing from one speed to another and serves only to gradually increase the speed of the car from the speed at which it has originally been moving to the speed to which the gearing has been advanced, thereby entirely eliminating the jerk and jar.

To accomplish these results it is a further object of the invention to provide a selecting mechanism which may be manipulated by the operator to enable any one of the transmission devices to be moved into operative position; to provide means for automatically disconnecting all the transmission devices from the driving member and causing the selected one of said transmission devices to be connected with said driving member; to provide means controlled by this same selector and power mechanism for imparting initial movement to the engine to start the same; to provide a spring motor for actuating the controlling mechanism which will be automatically rewound and which will perform the functions of the fly wheel, thereby enabling the latter to be dispensed with; and further, to provide transmission gears which are permanently in mesh and automatic fluid-controlled devices for gradually increasing the speed of the driven member to the speed of the driving member. Further, it is an object of the invention to provide in the several mechanisms entering into the device a simple, durable and practical construction which will require no delicate adjustments and which will be of such a character that there will be little likelihood of any of the parts becoming broken or disarranged in the operation of the device. In other words, the construction will be of such a character as to be practically "fool-proof."

Figure 2:
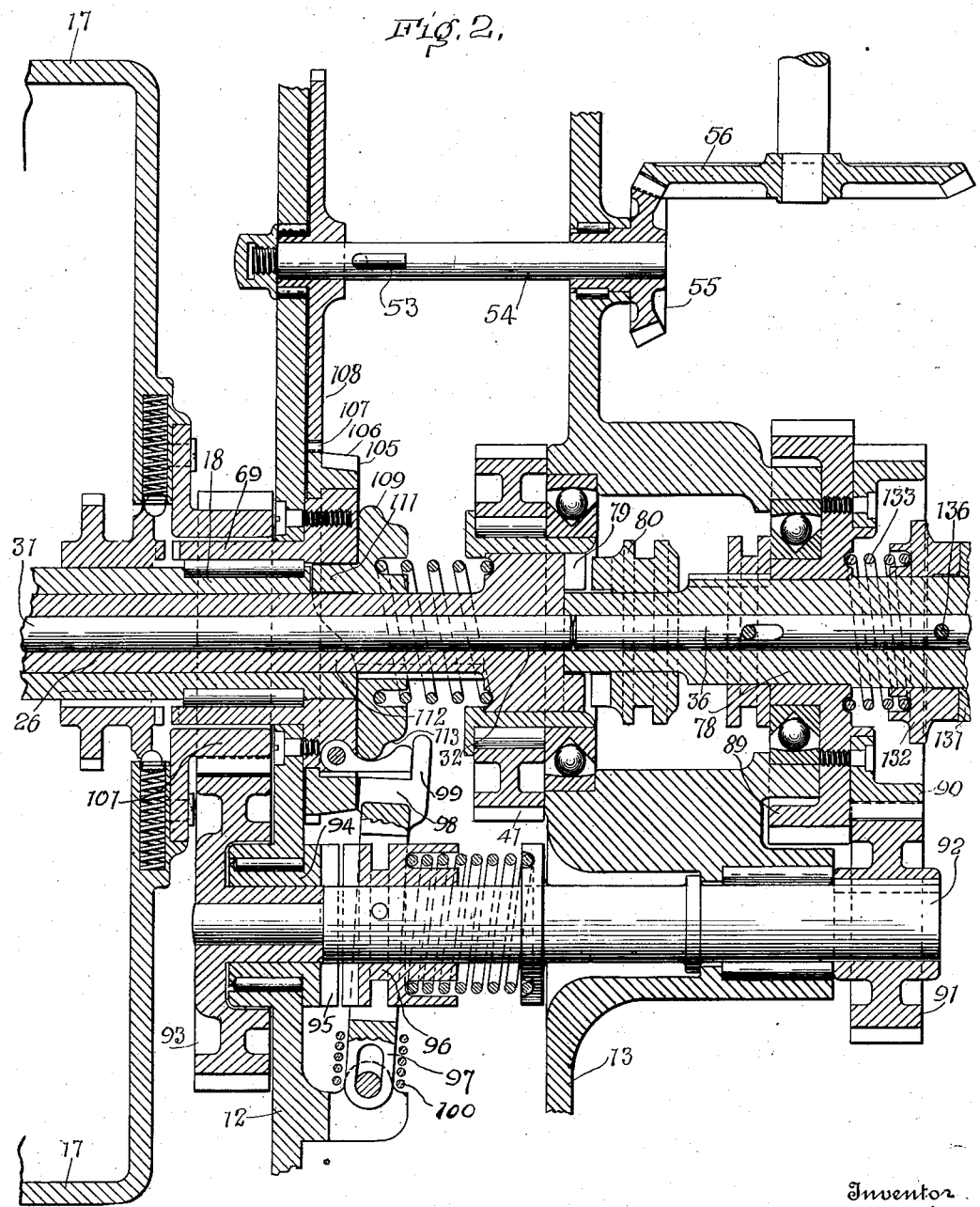
Figure 3:
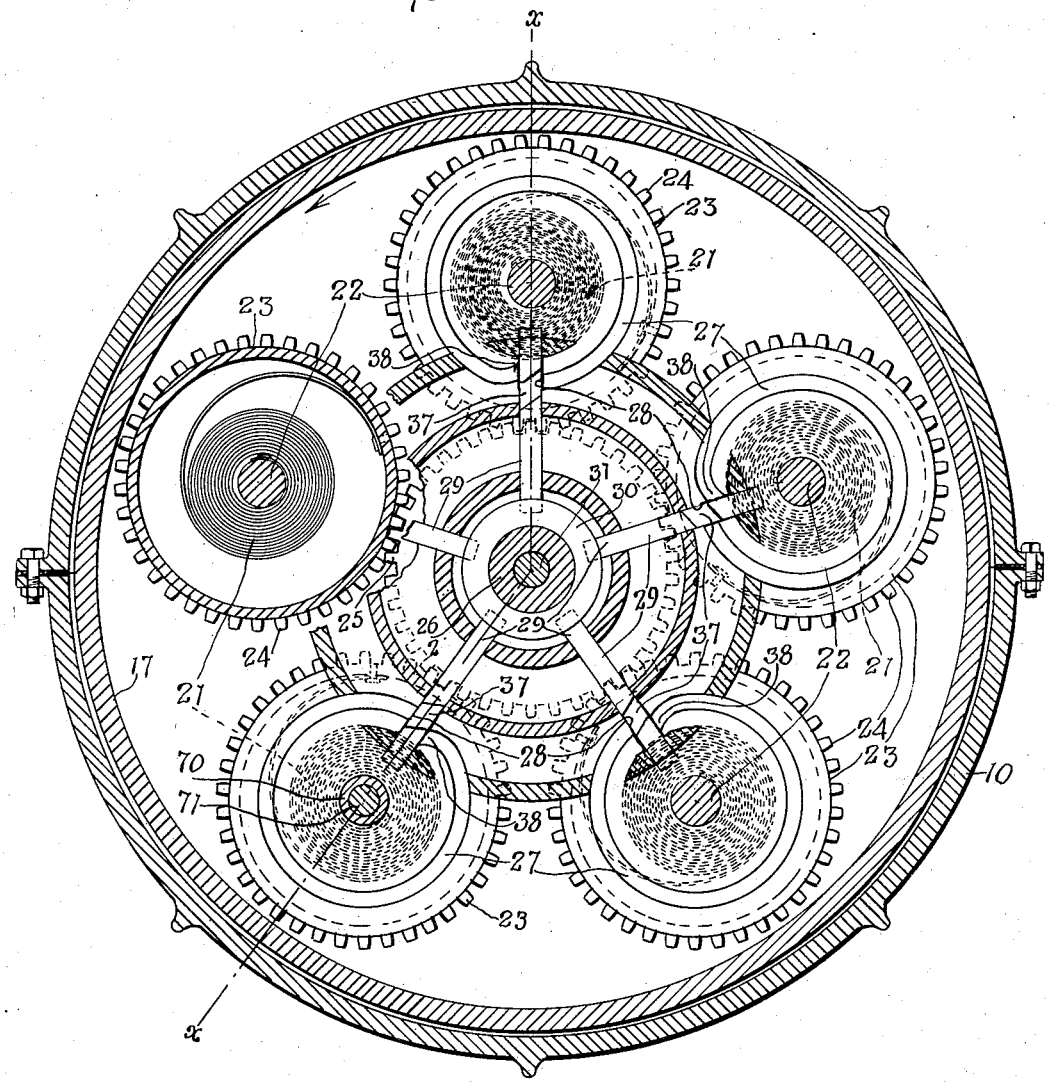
Figure 4:
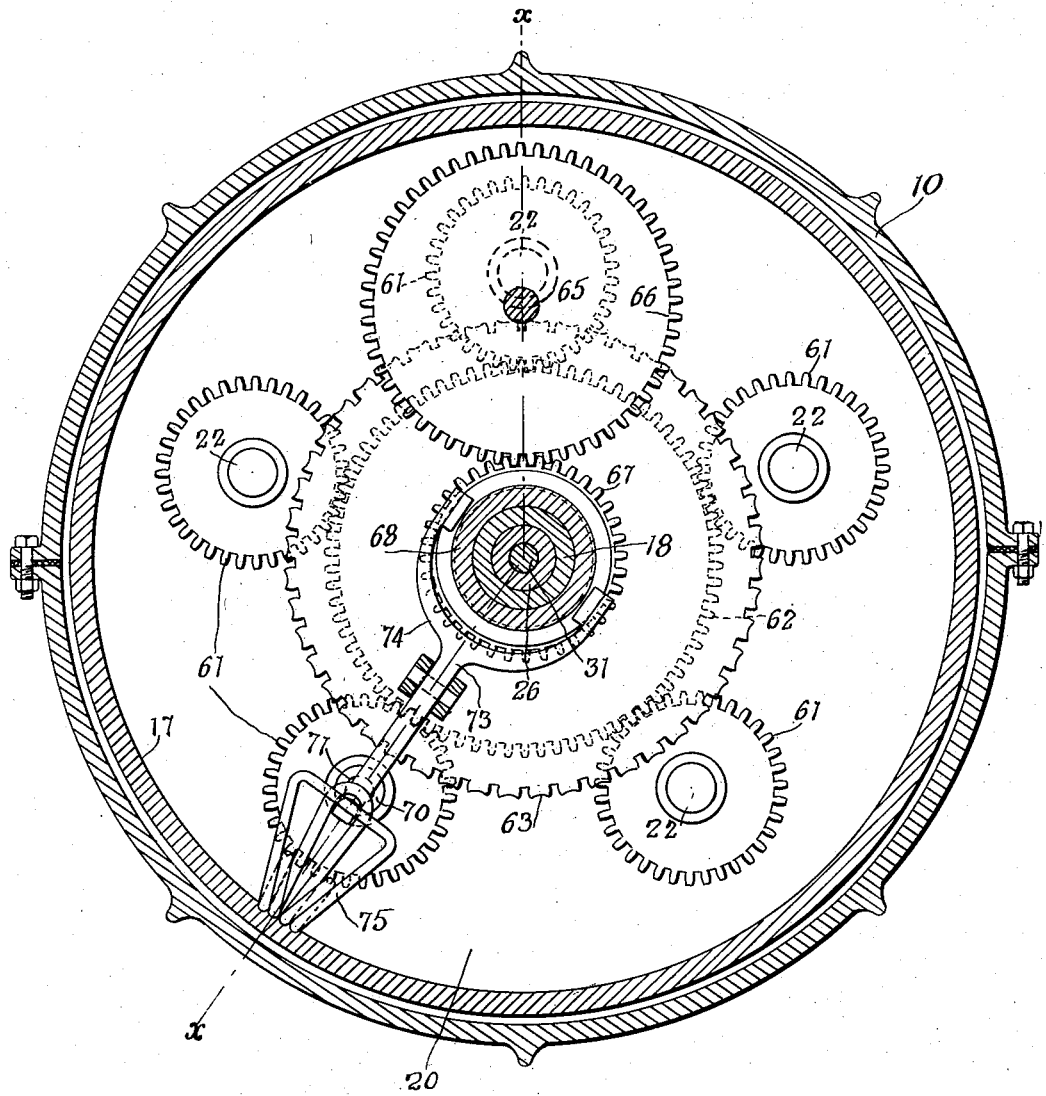
Figure 5:
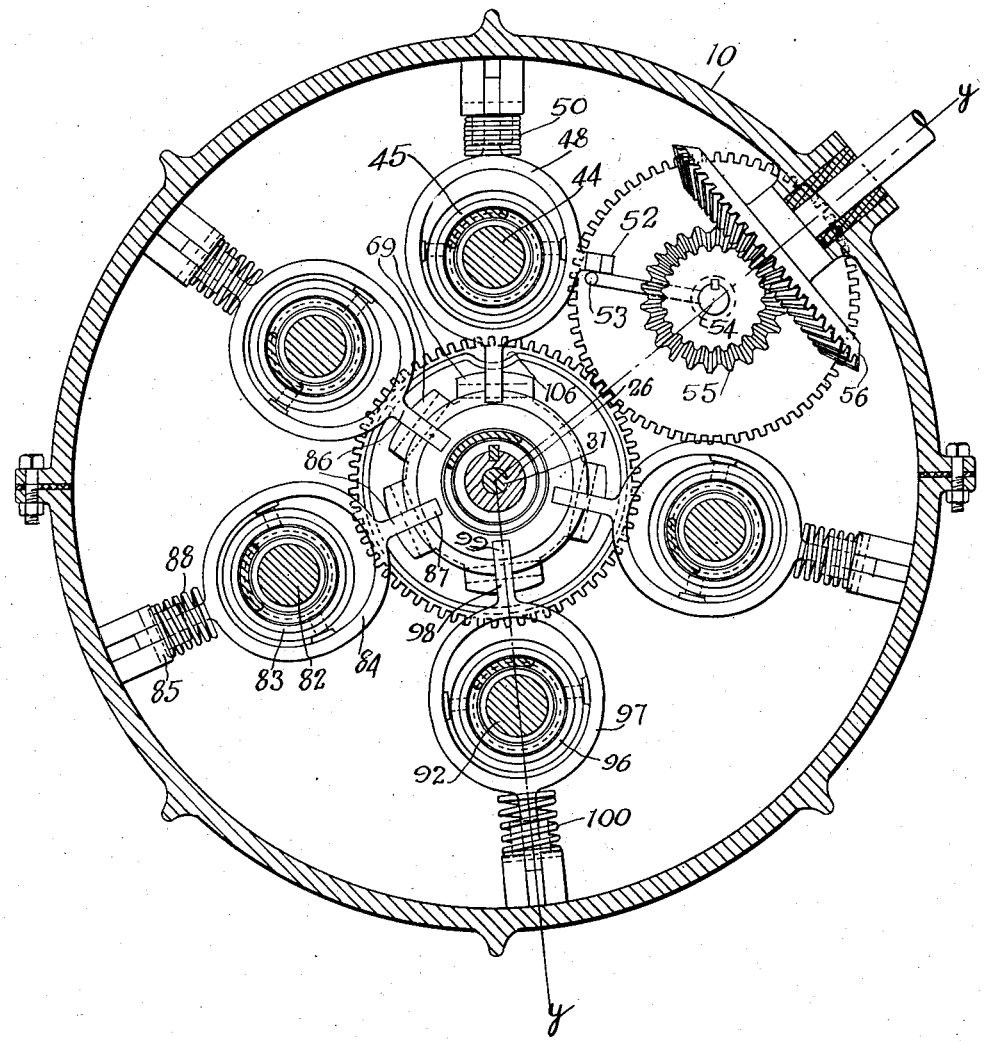
Figure 6:
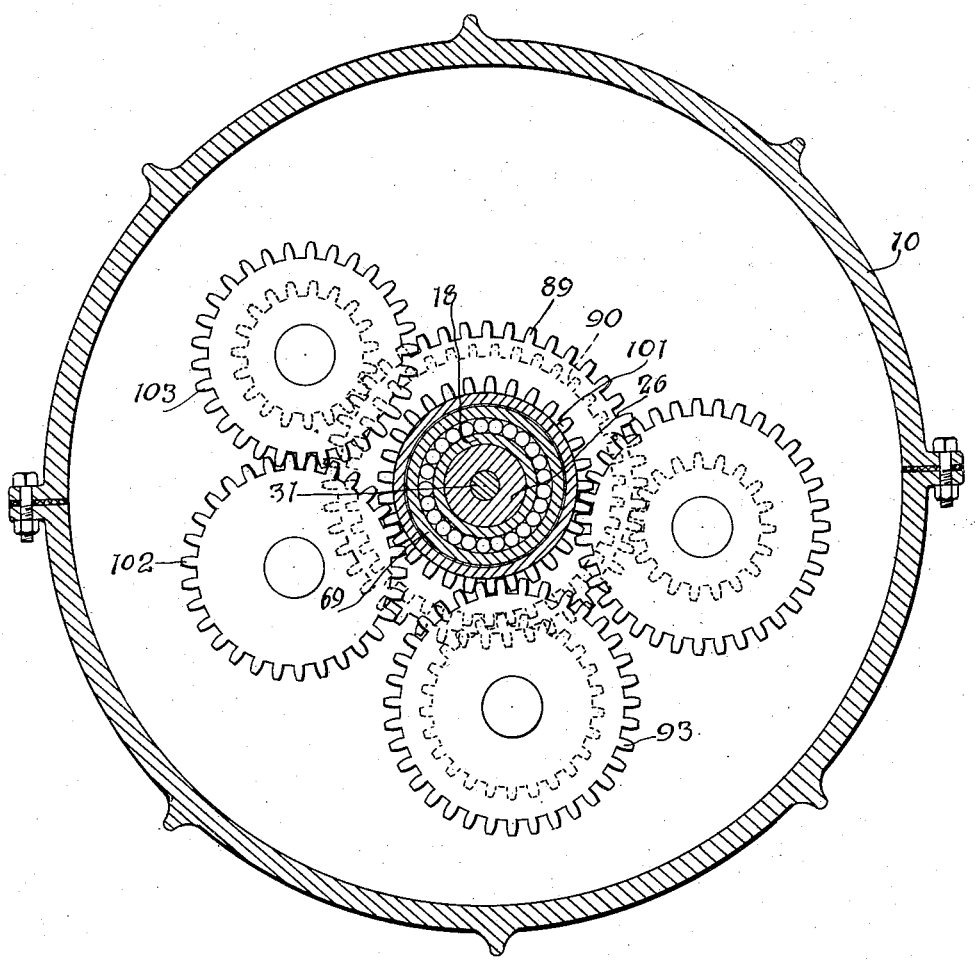

In the accompanying drawing, Figure 1 is a section taken on the line x x of Figs. 3 and 4; Fig. 2 is a sectional view taken on the line y y of Fig. 5; Fig. 3 is a transverse sectional view taken on the line 3 3 of Fig. 1 and looking in the direction of the arrows; Fig. 4 is a transverse, sectional view taken on the line 4 4 of Fig. 1 and looking in the direction of the arrows; Fig. 5 is a sectional view taken on the line 5 5 of Fig. 1, looking in the direction of the arrows and showing the setting mechanism in elevation; Fig. 6 is an end elevation of the transmission gearing showing the relative positions of the several gears; Fig. 7 is a transverse, sectional view taken on the line 7—7 of Fig. 1 and looking in the direction of the arrows; Fig. 8 is a side elevation of the mechanism showing the operating devices therefor; Fig. 9 is a plan view of the steering wheel with the setting device thereon; Fig. 10 is a sectional, detail view of the indicator forming a part of the setting device; Fig. 11 is a top, plan view of the valve and its actuating cam; Fig. 12 is a vertical section taken through the valve and clutch; Fig. 13 is a side elevation of the valve and its actuating cam; Fig. 14 is a detail view of the selector; Fig. 15 is a perspective view of the clutch mechanism for actuating the clearing device showing the parts separated; and Fig. 16 is a sectional detail view of the clutch connection between the gear and the actuating shaft.

In carrying out my invention I provide transmission devices to connect the driving member or engine shaft with the driven member which is connected with the driving wheels of the automobile. These transmission devices preferably comprise toothed gears for the low and intermediate speeds and reverse, which gears are always in mesh, and a direct connection, without gearing, for the high speed. Each transmission device is adapted to be connected with and disconnected from the driving member and selecting mechanism is provided to control these connections. This selecting mechanism is of such a character that it is possible for a single transmission device only to be connected with the driving shaft. Before any new connection is made the existing connection must be interrupted. The selecting of the speed is controlled by a controlling lever at the hand of the operator and the establishing of the selected connection is accomplished automatically by mechanism controlled by a lever or actuating device arranged for manipulation by the operator. In the present instance this actuating device merely releases power operated devices which establish the desired connection.

The transmission mechanism is connected with the driven member through a suitable yielding connection adapted to offer an adjustable resistance to the movement of the transmission mechanism relative to the driven member. This may be accomplished by fluid controlled devices and the amount of resistance may be controlled by a valve which regulates the flow of fluid to and from the fluid-controlled devices. I have so constructed the mechanism that when the releasing device for the power mechanism is actuated the valve or other adjusting device will be adjusted so that little or no resistance will be offered to the movement of the transmission mechanism relative to the driving member. When the connection has been established and the transmission mechanism begins to move or jumps to a higher speed the valve or regulating device is adjusted automatically to gradually increase the resistance until it is so great that the driven member is caused to rotate in unison with the transmission mechanism. When this condition is established a positive clutch is automatically thrown in to form a rigid connection between the driving and the driven members.

The power mechanism which operates the devices to establish the selected connection between the transmission mechanism and the driving member is preferably mounted on a revoluble support or casing which may be substituted for and which will perform the functions of a fly wheel. This motor may be of any suitable kind but preferably is in the form of a spring motor which is automatically rewound by the operation of the engine and which is normally locked against movement by devices which may be released by the operator. These locking devices and the means for releasing the same are such that the releasing of the spring motor will be so timed as to make it impossible for it to be released before the clutch between the transmission mechanism and the driven member has been disconnected and the resistance device adjusted to its lowest point, the disconnecting of the clutch mechanism and the releasing of the motor being preferably accomplished by a single act on the part of the operator. The motor may also, if desired, be utilized for starting the engine and to this end I have provided means controlled by the selector and actuating lever, which are under the control of the operator, to cause the motor when released to rotate the engine shaft.

The operation as above described may be accomplished in various ways and, in the present drawings, I have illustrated the invention as embodied in one form of mechanism by which the desired results may be attained, this form having been chosen for the purpose of illustration. As here shown the several parts of the mechanism are inclosed within a casing 10 arranged in alinement with and rigidly secured to the frame of the engine 11. This casing is preferably divided longitudinally and on a horizontal line into two parts, and the mechanism is secured to the lower portion thereof so that the upper part of the casing constitutes a cap which can be removed to afford access to the interior of the casing. The casing is divided into three compartments by means of transverse supporting frames or partitions 12 and 13 which are rigidly secured at their edges to the lower portion of the casing and, if desired, may also be secured at their edges to the cap or top portion of the casing by screws or other devices which can be loosened to permit of the removal of the cap. I have, in the present instance, shown the casing as divided transversely into three parts, the lines of division being adjacent to the respective partitions. This division is for the purpose of facilitating the assembling of the mechanism and is in no way essential to its operation. The casing is provided at its rear end with a bearing 14 through which extends a shaft 15 leading to the axle of the driving wheels, which shaft constitutes a driven member. The engine shaft 16, which constitutes the driving member, projects through the end of the engine frame into the casing 10 where it is rigidly secured to one side of a supporting frame or casing 17, which frame or casing is provided on its opposite side with a hollow trunnion 18 journaled in the partition or frame member 12. This supporting frame carries the power mechanism or motor and is substituted for and performs the functions of the fly wheel which is entirely omitted in the present embodiment of the invention. The power mechanism is here shown as a spring motor comprising a plurality of separate springs so connected as to act in unison. The supporting frame or casing 17 has transverse partitions or frame members 19 and 20 forming between them a compartment in which the springs are mounted. The number and arrangement of the springs comprised in the motor may be varied but, in the present instance, I have shown five springs, each of which is indicated by the reference numeral 21, (Figs. 1 and 3.) Each spring is secured at one end to and is wound about a shaft 22, which shaft is rotatably mounted in the frame members 19 and 20. Each spring is inclosed within and rigidly secured at its outer end to a casing 23 which is loosely mounted on the shaft 22 and is provided on its outer periphery with gear teeth 24. Thus, each casing constitutes a gear which meshes with a central gear 25 rigidly secured to a shaft 26 journaled at its forward end in the frame member 19 and extending rearwardly through the hollow trunnion 18 and journaled at its rear end in the partition 13 of the main casing. Suitable locking devices are provided to lock the springs of the motor against unwinding and these locking devices are under the control of the operator so that he can at will release the springs and permit the motor to operate. In the present embodiment of the invention the locking devices comprise annular flanges 27 projecting from the rear faces of the several casings 23 and arranged concentrically with the axes of the respective casings. Each flange has a notch or opening 28 through which extends a dog 29, the lower end of which is tapered and bears against the surface of a cone 30 carried by a reciprocating rod 31. In the present arrangement of the mechanism this rod is mounted within the shaft 26 which is provided with a longitudinal opening 32 to receive the same, and is adapted to have longitudinal movement imparted thereto by the operator. This may be accomplished in various ways but, in the present instance, a suitable operating lever 33 is mounted on the foot-board in a convenient position for manipulation by the operator and is connected by suitable connecting devices, comprising a rod 34 and a bell crank lever 35, with a second sliding rod 36 arranged in alinement with the opening 32 in the shaft 26 and bearing against but disconnected from the end of the rod 31. When the foot lever is pressed down by the operator the rod 31 will be moved forward and the cone 30 will force the dogs 29 outward. Each dog is provided with a notch 37 which is normally out of alinement with the corresponding flange 27 so that the end of the flange will bear against the face of the dog and the flange and its casing will be locked against rotation. The forward movement of the cone, which moves the dogs outward, causes the notches 37 of the several dogs to be brought into alinement with the ends of the respective flanges. It is desirable, however, for the purpose which will hereinafter appear, that the motor should not be released upon the forward movement of the releasing device and for this reason I have so constructed the locking devices that the flanges and their casings will be held against rotation after the notches in the dogs have been brought into alinement therewith and until the cone 30 has been released to permit the dogs to move inward. To accomplish this one end of each flange adjacent to the notches 28 therein is turned inward, as shown at 38, and the walls of the notches 37 in the dogs extend obliquely to the lengths of the respective dogs. When the dogs are in their normal positions the inturned ends 38 of the flanges will bear against the faces of the respective dogs and prevent the movement of the flanges and spring-casings.

When the dogs are moved outward the inturned ends 38 will enter the notches in the respective dogs and will engage the oblique walls of the dogs which will prevent the further movement of the flanges so long as the dogs are held against inward movement. As soon as the dogs are released and are permitted to move inward the tension of the springs will press the inturned ends of the flanges against the oblique walls of the notches in the dogs, thereby forcing the dogs inward and returning the same to their normal positions and releasing the flanges so that they are free to move in the notches. This permits each casing to make a complete revolution and when this revolution is completed, the inturned end of each casing will again engage the face of its dog which, as above stated, has been returned to its normal position.

I prefer to mount on the supporting frame 17 a dash-pot 39 having a piston 40 which is connected with one of the casings 23 and which serves to cushion the movement of the motor to prevent damage being done by the sudden operation thereof. It will be apparent, therefore, that if the gear 25 be held against movement and the springs released the expansion of the springs will rotate the motor frame 17 about its axis and consequently will impart rotatory movement to the engine shaft. Likewise, after the engine has started the motor frame will rotate with the engine and, the locking devices having again become operative, the spring casings will be held against rotation and will drive the gear 25 and shaft 26 in the direction of rotation of the engine shaft. The first of these movements may, therefore, be used for starting the engine by providing means whereby the shaft 26 may be locked against movement in a reverse direction and permitted to rotate freely in the direction of rotation of the engine shaft. This may be accomplished in various ways but it is desirable for reasons that will hereinafter appear to provide means whereby the device may be allowed to rotate in a reverse direction as well as in a forward direction. To that end I have mounted on the shaft 26 near the partition or frame member 13 a gear 41 and have connected this gear with the shaft by means of a roller clutch 42 (Fig. 16), arranged to lock the gear to the shaft when the power is exerted on the shaft in a direction to rotate the same rearwardly and to permit the shaft to rotate freely in a forward direction.

The gear 41 meshes with a gear 43 on a shaft 44 journaled in the partitions or frame members 12 and 13 and having splined thereon a spring-actuated clutch member 45 adapted to coöperate with a fixed clutch member 46 carried by the partition 12. It will be apparent that when the clutch member 45 is unrestrained it will operatively engage the clutch member 46 and the whole train of gearing to the gear 25 will be locked against movement. The clutch 45 may be controlled in various ways but as here shown it is provided with an annular groove 47 to receive a yoke 48 which is pivotally and slidably connected at its upper end to the casing 10, as shown at 49. A spring 50 tends to move the yoke downward and the yoke is provided at its lower end with a finger 51 which will be engaged to move the yoke in a direction to disengage the clutch members. When it is desired to operate the engine the yoke must be moved in a direction to release the clutch member 45 and permit the same to be moved into operative position. To this end the yoke is provided with a lateral projection 52 (Fig. 5) adapted to be engaged by a pin 53 carried by a shaft 54 having at its rear end a bevel gear 55 meshing with a corresponding gear 56 which is connected through suitable gearing with a rod 57 mounted on a steering post 58 and having at its upper end a setting handle 59 adapted to travel over a segment or gage 60 having thereon the indications—"Engine," "Low," "Intermediate," "High," and "Reverse." The ratio of the gearing is such that when the setting handle is moved to "Engine" the yoke 48 will have been elevated to release the same and allow the clutch 45 to move into operative position. The controlling lever is then actuated to release the spring motor. The motor frame is rotated, as above described, and a single revolution imparted to the engine shaft. If this fails to start the engine the controlling lever is pressed a second time, thus imparting a second revolution to the engine. While ordinarily this will start the engine the motor is powerful enough to impart a large number of revolutions to the engine shaft without being rewound. To protect the mechanism in case the engine should back fire I have interposed a frictional connection 104 between the gear 43 and the shaft 44. The friction of this connection is adjusted to such a degree that it will withstand the strain imposed thereon when the engine is started, but should there be any extraordinary strain imposed thereon, as by the back firing of the engine, the connection will yield and permit the gear to rotate while the clutch members 46 and 47 are in engagement. After the engine is started the spring motor is automatically rewound. This rewinding may take place after each operation of the motor or it may take place only after a given number of rotations. It is accomplished through a train of gearing connected with the shafts of the several springs and driven by the rotation of the motor frame. As shown in the present drawings, each motor shaft 22 has secured thereto a gear 61, the several gears 61 meshing with a central gear 62, which is rigidly secured to a third gear 63 of slightly larger diameter than the gear 62 and rotatably mounted upon the hollow trunnion 18 of the motor frame. It will be noted that this hollow trunnion of the motor frame is carried by the intermediate frame member or partition 20 and extends through an opening in the rear wall of the frame.

Mounted on the rear wall of the motor frame is a one-toothed gear 65 which meshes with the gear 63 and which is rigidly secured to a gear 66 which meshes with a gear 67 rotatably and slidably mounted on the hollow trunnion 18 and having a clutch member 68 adapted to be moved into and out of engagement with a fixed clutch member 69 carried by the partition or frame member 12 of the main casing. The gear 63 is preferably provided with wide teeth having their outer ends recessed and adapted to be engaged by the cylindrical body portion of the one-toothed gear 65 to form a lock. It will be apparent that when the gear 67 is clutched to the fixed frame member 12 the rotation of the motor frame about this gear, which has thus become fixed, will cause the gear 66 to be rotated and to carry with it the one-toothed gear 65, which latter gear will advance the gears 62 and 63 one tooth for each complete revolution of the gear 66 and this movement will be imparted in turn to the gears 61 on the spring shaft. Consequently, it will be apparent that the operation of the engine will, through the rotation of the engine shaft, slowly rewind the springs. This rewinding of the springs is automatically controlled and this is accomplished by forming one of the spring shafts hollow, as indicated at 70, in the lower spring of Fig. 1. Slidably mounted within the hollow shaft 70 and splined thereto for sliding movement therein is a rod 71 having one end screw-threaded and inserted in a nut or screw-threaded cap 72 carried by the spring housing 23. Consequently, rotation of the spring housing 23 while the spring unwinds will impart longitudinal movement to the rod 71. The opposite end of the rod bears against a lever 73 pivotally supported on the wall of the motor frame and having at its upper end a yoke 74 engaging the clutch member 68. A spring 75 bears against the lower end of the lever 73 and tends to move the same in a direction to carry the clutch member into engagement with its coöperating clutch member 69, although it is obvious that a suitable connection could be made between the rod and the lever to move the lever positively in both directions. The movement of the clutch is preferably accelerated by suitable spring-actuated followers 76 arranged to engage on either side of a tapered flange 77 carried by the clutch and accelerate the movement of the clutch. Thus, it will be apparent that as the spring unwinds, due to the operation of the motor, the rod 71 will be moved to the left in Fig. 1 and the spring 75 will move the clutch member 68 toward its coöperating clutch member 69. When the clutch member 68 is moved far enough to carry the flange 77 past the points of the followers 76, the springs of these followers will force them down and quickly complete the movement of the clutch member, thus carrying it into engagement with the clutch member 69 and causing the rotation of the motor frame to set the train of gearing above described in motion and rotate the several spring shafts to rewind the springs. This rewinding of the springs causes the rod 71 to be moved to the right in Fig. 1, thus moving the lever 73 in a direction to disengage the clutch members and interrupt the rewinding operation. The movement of the rod 71 is so regulated that the rewinding operation will be started and stopped in a manner and at such times as will keep the springs of the motor properly wound.

Power is transmitted from the motor frame 17 to the driven member 15 through suitable transmission mechanism comprising a rotatable member 78 which may be connected to the driving member by any one of a plurality of transmission devices, each of which is adapted to impart a different movement to the rotatable member 78. The transmission device for high speed is preferably such as to connect the rotatable member 78 directly with the motor frame which, in turn, is rigidly secured to the engine shaft so that the power is directly transmitted without gearing and, in the present instance, I have utilized the hollow shaft 26 as the transmission device for the high speed. To this end I have provided the rear end of the shaft 26 with a clutch member 79 (Fig. 2) adapted to coöperate with a second clutch member 80 slidably mounted on the rotatable member 78. The clutch member 80 is controlled by a yoke 81 secured to one end of a sliding rod 82 mounted in the frame members or partitions 12 and 13 and having thereon a grooved collar 83 to which is connected a yoke 84 pivotally and slidably connected at its lower end to the casing, as shown at 85, extending about the slidable rod 82 and having at its upper end a head 86 provided with a projection or finger 87. A spring 88 coiled about the lower end of the yoke tends to move the same inwardly toward the shaft 26. The yoke 84 is manipulated to control the clutch member 80 in a manner which will be hereinafter described.

The rotatable member 78 of the transmission mechanism is provided with two or more gears, depending upon the number of speeds which the mechanism is adapted to transmit. In the present instance I have provided but two gears, 89 and 90, for the low and intermediate speeds. Separate transmission devices are provided for the low and intermediate speeds and for the reverse. Each of these transmission devices comprises a gear, as shown at 91 in Fig. 2, mounted on a shaft 92 slidably mounted in the frame members or partitions 12 and 13. This shaft is adapted to be clutched to a suitable driving gear and, in the present instance, the driving gear is shown at 93 as journaled upon the frame member 12 and as having a hollow trunnion 94 into which the reduced end of the shaft 92 extends and in which it rotates. The hollow trunnion of the gear 93 extends through the frame member 12 and is provided on its inner end with a clutch member 95 which rotates with the gear. Slidably mounted upon the shaft 92 is a spring-actuated clutch member 96 adapted to be moved into and out of operative engagement with the clutch member 95. The clutch member 96 is controlled by means of a yoke 97 extending about and connected with the clutch member and having at its upper end a head 98 provided with a projection or finger 99. The yoke 97 is pivotally and slidably mounted at its outer end on the casing and has coiled about it a spring 100 which tends to move the same inwardly toward the shaft 26. The gear 93 is driven from the motor frame or casing 17 and to this end that casing has rigidly secured to the rear wall thereof a gear 101 which extends loosely about the fixed clutch member 69 on the frame member 12 and is in constant mesh with the gears for the low and intermediate speed transmission devices. The transmission device for the reverse is driven from the gear 101 but indirectly, as through an idler 102 (Fig. 6) which meshes with the gear 101 and with a gear 103 on the reversing transmission device. Thus, I reverse the direction of drive of the transmission device and allow the gear at the other end of this transmission device to mesh directly with one of the gears of the rotatable member 78, preferably the low speed gear. The construction of the transmission devices for the reverse and the low speed are similar to that for the intermediate speed which has been described, and it is not necessary to describe them in detail.

It will be noted that the actuating levers or yokes, for the clutches of the several transmission devices are grouped about the central shaft 26 and are capable of a substantially radial movement toward and away from said central shaft and a swinging movement about their pivotal centers lengthwise of the respective transmission devices. This lengthwise movement serves to move the clutch member. As here shown, the levers or yokes move the clutches into their inoperative positions only and the movement of the clutches to their operative positions is accomplished by the springs which engage the respective clutch members.

In order that a selected transmission device may be connected with the driving shaft and that it may be possible to connect one transmission device only to the driving shaft at any one time I have provided a selector mechanism which is of such a character as to absolutely control the movement of the clutch controlling levers of the transmission devices. This selector mechanism may be so positioned that a selected one of said transmission devices, or the clutch of the starting device, may be connected with the driving shaft or it may be so positioned that none of the transmission devices can be so connected. Coöperating with this selector is what may be called a clearing device which serves to disconnect from the driving shaft any transmission device which may be connected therewith prior to the connection of a selected transmission device with said driving shaft. Further, means are provided and, in the present instance, are embodied in the clearing device for so positioning the clutch actuating levers that the selected one may move into a position to permit its clutch member to become operative. In the mechanism here illustrated the selector mechanism comprises a collar 105 rotatably mounted upon the frame member 12 and having its rear edge or face arranged in the path of the heads carried by the respective clutch actuating levers. The relation of the levers to the selector or collar is such that when the heads are in engagement with the face of the collar the levers will be held in such positions that their clutch members will be held out of engagement with the coöperating clutch members, thus making it impossible to connect any one of the transmission devices with the driving shaft so long as the head of its clutch actuating lever is in engagement with the face of the selector collar. This selector or collar is provided with a groove 106 which may be moved by the rotation of the collar into alinement with any one of the clutch actuating levers to permit that clutch actuating lever with which it is in alinement to move forward a distance sufficient to enable its spring-actuated clutch member to operatively engage its coöperating clutch member, thereby connecting that particular transmission device with the driving shaft. The actuating levers are, however, normally forced radially inward by their springs such distances that the heads of the levers will project beyond the bottom of the groove 106, which groove extends for only a portion of the thickness of the collar and, consequently, before the selected lever can move into the groove it is necessary that the lever should be forced outward against the tension of its spring to bring the head thereof into true alinement with the groove in the collar. This is accomplished by the device above mentioned for positioning the levers.

The selector or collar may be adjusted with relation to the clutch actuating levers in any suitable manner. In the present instance it is provided with a gear 107 which meshes with a gear 108 secured to the shaft 54 which is controlled by the setting handle on the steering wheel. Thus, by adjusting the setting handle on the steering wheel to a given point the selector will be so adjusted that its groove will be brought into alinement with the clutch actuating lever of the transmission device for the particular speed or operation to which the handle has been set. The groove in the collar is so shaped that pressure applied to the collar will rotate the same against the risistance offered by any lever which may be in engagement with the groove and will force that lever outward against the action of its spring so that the head thereof will ride over the periphery of the selector collar and will permit the selector to be adjusted to another point without interrupting the connection already existing between one of the transmission devices and the driving shaft. This connection will be interrupted only when the clearing device has been actuated. The clearing device may be of any suitable character which will permit it to be actuated by the motor and, in the present instance, I have shown it as comprising a collar 109 slidably mounted on the shaft 26 and held against rotation thereon. A spring 110 holds the collar normally against the face of that part of the frame member 12 on which the selector is mounted. The clearing collar is provided with a forwardly projecting tooth 111 having one face inclined to coöperate with the corresponding inclined tooth 112 secured to the end of the trunnion 18 of the motor frame. The inclined edges of the teeth are so arranged that when the shaft 26 and collar 109 are turned forwardly relatively to the motor frame and hollow trunnion 18 the inclined faces of the teeth will ride over one another and force the collar rearwardly against the tension of its spring, thus causing the collar to engage the fingers projecting from the ends of the clutch actuating levers and move these levers rearwardly to carry their clutch members into inoperative positions, thereby disconnecting all of the clutch members from the engine shaft and consequently disconnecting the engine shaft from the driven shaft and the load. The instant the coöperating teeth of the trunnion and clearing collar have passed one another the spring 110 will move the collar forward to its normal position, thus freeing the several clutch actuating levers and allowing that particular lever which is in alinement with the groove in the selector collar to be moved forward and its clutch member carried into engagement with the coöperating clutch member, thereby connecting that particular transmission device with the driving shaft. The relative movements of the trunnion and the clearing collar may be secured by merely releasing the motor. It will be understood that the motor frame is revolving with the driving shaft, that the several springs of the motor are locked against movement and, consequently, the gears of their casings are locked against rotation, thereby causing the rotation of the motor frame to rotate the gear 25 and the shaft 26. When the motor springs are released they will impart a complete rotation to the shaft 26 in a reverse direction or if this shaft is held against rotation, they will cause the motor frame to rotate at an increased speed and make a complete rotation in advance of the shaft 26. In either instance the coöperating teeth of the trunnion and clearing collar will be brought into engagement and the clearing collar actuated. As has been stated, the heads of the several clutch actuating levers bear normally against the rear face of the selector collar and overlap this face a distance greater than the depth of the groove in the collar, thus making it necessary to move the lever radially outward before its head can enter the groove. To accomplish this I have pivotally mounted on the frame member 12 adjacent to each clutch actuating lever a dog 212 having an inclined face arranged to be engaged by the edge of the clearing collar 109. The finger carried by the lever is preferably bifurcated to permit this dog to pass through the same when the lever moves into the groove. The dog rests upon the inner face of the head of the lever and as the clearing collar moves outward its edge rides over the inclined face of the dog and forces the dog and the lever outward. The clearing collar is provided with an annular shoulder 113 which will engage the free ends of the fingers of the levers and hold the same in their outermost positions so long as the clearing collar and the clutch-actuating levers move in unison. In the case of that lever which is in alinement with the groove in the selector collar the lever and clearing collar will move together for their full movements, and the lever will be held outward by the clearing collar to enable its head to enter the groove in the selector collar. The other collars either being in engagement or coming in engagement with the face of the selector collar will be held against further movement and the clearing collar will move out of engagement with their fingers and these other levers will then move inward to their normal positions.

It will be noted that the finger of the actuating yoke 48 for the clutch of the starting mechanism is moved beyond the edge of the clearing collar when this clutch is in its operative position. Consequently, the movement of the clearing collar will not disconnect the clutch. This can be disconnected only by the further manipulation of the setting lever on the handle which will release the yoke 48 and permit it to be moved radially inward by its spring, thus carrying its finger into a position to be engaged by the clearing collar on the next operation thereof. I wish it to be understood in connection with the description of the invention that the term "clutch" as herein employed is intended to include any operable device which may be utilized to connect any one of the transmission devices with the driving shaft; that the form of mechanism shown in the present instance is very satisfactory in operation but it is possible to accomplish substantially the same results in other ways.

By the mechanism heretofore described I am able to connect the driving shaft with the rotatable member 78 of the transmission mechanism so as to cause this member to rotate in the desired direction and at the desired speed. This rotatable member is connected with the driven shaft in order that the power transmitted to it may be transferred to the driven member. A direct connection may be formed, of desired, but I prefer to provide a connection which will absorb the shock due to starting or changing of speeds. To this end I have provided a yielding connection which will permit the rotatable member of the transmission mechanism to rotate relatively to the driven member. The resistance offered by the yielding member is adjustable and the operation of the rotatable member serves to automatically adjust this resistance to gradually increase the speed of the driven member until this latter member is rotating in unison with the transmission mechanism. When this condition is brought about a positive clutch is automatically brought into operation to form a positive connection between the transmission mechanism and the driven member. In the particular embodiment of the mechanism here shown I have employed fluid controlled devices for forming the connection between the transmission mechanism and the driven member and have provided a valve to control the flow of fluid to and from these devices and thus increase or decrease the resistance offered thereby to the movement of the rotatable member relative to the driven member. This valve is automatically controlled. To embody this fluid controlled connection in the mechanism I have mounted in the rear portion of the main casing a supporting frame or housing 114 which is rigidly secured to the driven member 15 and which has mounted therein one or more fluid cylinders 115. In the present instance I have employed three cylinders but the number may be varied according to circumstances. Mounted in each cylinder is a piston 116 connected with a crank 117 rigidly secured to the end of the rotatable member 78 which is journaled in a bearing 118 in the inner wall of the supporting frame or housing 114. The opposite ends of each cylinder 115 are connected one with the other by means of suitable conduits 119. The movement of the pistons in the respective cylinders will, of course, force the fluid from one end to the other according to the direction of movement of the pistons and the freedom with which the fluid can flow from one end of the cylinder to the other will control the speed at which the piston may move and will thus cause a greater or lesser rotary effort to be applied to the driven members to which the cylinders are connected. So long as the flow of fluid is practically unrestricted the pistons will move freely in their cylinders and the operation of the transmission mechanism will serve merely to actuate these pistons and little or none of the power will be transmitted to the supporting frame 114. By restricting the flow of the fluid through the conduits resistance is offered to the movements of the pistons and as a result movement is imparted to the supporting frame and the driven member, this movement increasing in speed as the flow of the fluid is further restricted. When the flow of fluid has been completely interrupted the pistons will have little or no movement in their cylinders and the driven member will be moving at substantially the same speed as the transmission mechanism. The restriction of the flow of fluid from one side of each piston to the other side thereof is, in the present instance, accomplished by a single valve 120 interposed in the several conduits and comprising a rotary member 121.

As here shown the valve proper comprises a casing formed in two parts, the two parts having ports which register one with the other and with the two parts of the conduits 119. Arranged between the two parts of the valve casing, which are connected by screw threads or otherwise, is the rotary member 121 which is provided with apertures arranged to be moved into or out of alinement with the ports, this movement serving to open or close the ports. The rotary member 121 is mounted on a rotary rod or shaft 121$^b$ journaled in an aperture in the valve casing, and a spring 121ª, coiled about the shaft 121ᵇ and connected at one end to the shaft and at the other to the bearing therefor, tends to move the valve toward its open position, in which position it offers no restriction to the flow of the fluid through the conduits. The rotary valve member 121 has an arm 122, here shown as secured to the shaft 121ᵇ, arranged to ride over an inclined flange or cam shaped member 123 rotatably mounted on the hub or bearing 118 of the supporting frame 114. This cam is here shown in Fig. 12 as approximately circular and mounted eccentrically of the shaft 36. Further, that portion of the cam having the longer radius is offset, as shown in Fig. 11, to maintain the same always in proper relation with the end of the finger 122. The rotary member also has secured thereto a segmental gear 124 meshing with a similar gear 125 secured to a finger 126 which is pivotally mounted adjacent to the valve. Rigidly secured to and in the present instance forming an integral part of the cam 123 is a gear 127 meshing with a pinion 128 mounted on a shaft 128ª journaled in the wall of the supporting frame 114 and having at its inner end a gear 129 meshing with a gear 130 which is connected with the transmission mechanism. In the present instance the gear 130 is rigidly secured to the end of the rotatable member 78 and forms the support for the crank pin 117. It will be obvious, however, that the cam 123 may be driven from the rotatable member 78 in any suitable manner. The hub or bearing 118 of the supporting frame 114 is provided at its forward end with a clutch member 131 adapted to coöperate with a clutch member 132 which is slidably mounted on the rotatable member 78 and held against rotation relatively thereto. A spring 133 tends to move the clutch member 132 toward its operative position, that is, into a position to engage the clutch carried by the frame 114 and positively connect this frame with the rotatable member of the transmission mechanism. The clutch member 132 is connected with the hub of the cam 123, which is slidably mounted on the bearing 118 by devices which will cause these parts to move simultaneously in opposite directions. In the present instance two pivoted arms 134 are connected respectively with the clutch and cam and have their hubs provided with intermeshing gear teeth 135. The clutch member 132 is connected with the sliding rod 36. In the present instance this connection is formed by means of a pin 136. As a result of this connection the manipulation of the controlling lever to release the spring motor will first, through the forward movement of the rod 36, disengage the clutch member 132 from the supporting frame forming a part of the driven member, thus disconnecting the driven member from the driving member. This movement of the clutch imparts longitudinal movement to the cam 123 and carries the same out of the path of the finger 122 of the rotatable member of the valve, thus allowing this valve to be rotated by this spring and moved to its wide open position. Simultaneously with the downward movement of the finger 122 to open the valve the finger 126 moves downward into the path of the clutch member 132, thus locking this clutch member in its inoperative position. The rotation of the rotatable member 78 through the connections heretofore described causes the cam 123 to rotate and to engage the finger 122. As this finger rides over the cam in the course of rotation of the latter the valve is gradually closed and is, after a predetermined interval, completely closed. When the finger 122 has been moved to a position to completely close the valve the finger 126 will have been moved out of the path of the clutch member 132 and this clutch member will be moved by its spring into operative engagement with the clutch of the supporting casing 114, which is now rotating at the same speed as the rotatable member of the transmission mechanism.

The setting lever 59 and the coöperating guide 60 are preferably provided with means whereby the position of the lever on the guide can be determined in the dark as well as in the light. While this may be accomplished in various ways I have, in the present instance, formed each of the indications or points of the guide on which the setting lever must be stopped to set the mechanism to cause corresponding operations thereof, of translucent material, as indicated at 140 in Fig. 10, and I have arranged back of this translucent material an incandescent lamp 141. These lamps may be illuminated all the time or at such intervals as may be desired and will serve as guides in the movement of the setting lever but to further indicate when the lever is in correct position with relation to one of these guides I have provided the same with an opening in which I have placed a piece of colored translucent material, such as red glass, as indicated at 142. So long as the lever is out of alinement with any one of the indications this red glass will not show in the dark but as soon as it is moved into alinement with one of the indications a red light will show. In the present instance I have inclosed the several lamps by forming the segmental guide 60 as a housing with upwardly extending side walls 143 which inclose the lamps and support the translucent disks 140.

The operation of the mechanism will be understood from the foregoing description of the several parts thereof and it will be apparent that I have eliminated all shifting of gears and manipulation of clutches by the operator and have provided means whereby it is only necessary for him to select the operation which he desires and manipulate a single controlling lever and the operation desired will be accomplished automatically, this automatic operation including the cutting off of the power from the driven member, disconnecting of all parts connected with the driving mechanism and connecting with the driving mechanism the part necessary to accomplish the result desired. The result may be either the starting of the engine, the throwing of the machine into low, intermediate or high speed or into reverse.

While I have shown and described means for providing the five operations stated, which are the operations necessary in controlling the ordinary car, it will be obvious that other or additional operations may be accomplished in substantially the same manner by additions to or slight modifications of the mechanism here shown. Further, it will be apparent that the application or increase of power to the driven member is gradual, thereby eliminating the jerk or shock which commonly accompanies the throwing in or shifting of gears. Further, it will be apparent that the mechanism is of a very powerful construction and of a compact arrangement; and that the several parts thereof are simple and are so operated that there is little or no danger of any of them becoming broken or disarranged in the normal operation of the mechanism.

I wish it to be understood that I do not desire to be limited to the details of construction shown and described, for obvious modifications will occur to a person skilled in the art.

Having thus fully described my invention, what I claim as new and desire to secure by Letters Patent, is:—

1. The combination, with a driving member, a driven member, and a connection between said driving member and said driven member comprising variable speed transmission mechanism, of mechanism to disconnect said driving member from said driven member and to automatically shift said variable speed transmission mechanism to vary the speed of said driven member, and a controlling device, a single operation of which will cause said members to be disconnected and said transmission mechanism to be shifted.

2. The combination, with a driving member, a driven member, and a connection between said driving member and said driven member comprising variable speed transmission mechanism, of mechanism to disconnect said members, automatically shift said transmission mechanism to vary the speed of the driven member and to automatically reconnect said members one to the other, and a controlling device, a single operation of which will cause said members to be disconnected, the transmission mechanism to be shifted and said members to be reconnected.

3. The combination, with a driving member and a driven member, of variable speed transmission mechanism to connect said members one with the other, mechanism to disconnect said members, automatically shift said transmission mechanism to vary the speed thereof and to gradually reëstablish the connection between said members, and means to control said mechanism.

4. The combination, with a driving member, and a driven member, of variable speed mechanism to connect said members one to the other, spring operated mechanism to shift said variable speed mechanism to vary the speed thereof, and a single device for disconnecting said driving member from said driven member and causing said spring operated mechanism to act on said transmission mechanism.

5. The combination, with a driving member, and a driven member, of variable speed mechanism to connect said members one to the other, power operated mechanism to shift said variable speed mechanism to vary the speed thereof, a single device for disconnecting said driving member from said driven member and causing said power operated mechanism to act on said transmission mechanism, and a selecting device movable into different positions to control the shifting of said transmission mechanism.

6. The combination, with a driving member, and a driven member, of variable speed mechanism to connect said members one to the other, power operated mechanism to shift said variable speed mechanism to vary the speed thereof, a single device for disconnecting said driving member from said driven member and causing said power operated mechanism to act on said transmission mechanism, and means to automatically reëstablish the connection between said driving member and said driven member.

7. The combination, with a driving member, and a driven member, of variable speed mechanism to connect said members one to the other, power operated mechanism to shift said variable speed mechanism to vary the speed thereof, a single device for disconnecting said driving member from said driven member and causing said power operated mechanism to act on said transmission mechanism, and automatic means to reconnect said driving member with said driven member and gradually increase the speed of said driven member to the speed of said transmission mechanism.

8. The combination, with a driving member, and a driven member, of transmission mechanism to connect said driving member with said driven member, power-operated devices to shift said transmission mechanism from one position to another, means to disconnect said driving member and said driven member and to cause said power operated devices to act on said transmission mechanism, means to automatically interpose a yielding connection between said transmission mechanism and said driven member, which connection will permit said transmission mechanism to rotate relatively to said driven member, and means to gradually reduce the movement of said transmission mechanism relatively to said driven member.

9. The combination, with a driving member, and a driven member, of transmission mechanism to connect said driving member with said driven member, power operated devices to shift said transmission mechanism from one position to another, means to disconnect said driving member and said driven member and to cause said power operated devices to act on said transmission mechanism, and automatic means to interpose a yielding connection between said transmission mechanism and said driven member which will permit the transmission mechanism to rotate relatively to the driven member, to gradually reduce the relative movement of said parts and to positively connect said parts when they are moving in unison.

10. The combination, with a driving member, and a driven member, of a rotatable member having annular gears, a connection between said rotatable member and the driven member, transmission devices having gears mounted independently of said driving member and permanently in mesh with the respective gears of said rotatable member, devices to separately connect each of said transmission devices with said driving member, and selecting mechanism to control said connections.

11. The combination, with a driving member, and a driven member, of a rotatable member having annular gears, a connection between said rotatable member and the driven member, transmission devices having gears permanently in mesh with the respective gears of said rotatable member, and automatic mechanism to operatively connect a selected one of said transmission devices with said driving member.

12. The combination, with a driving member, and a driven member, of a rotatable member having annular gears, a connection between said rotatable member and the driven member, transmission devices having gears mounted independently of said driving member and permanently in mesh with the respective gears of said rotatable member, and positively actuated mechanism to disconnect said transmission devices from said driving member and to connect a selected one of said transmission devices with said driving member.

13. The combination, with a driving member, and a driven member, of a rotatable member having annular gears, a connection between said rotatable member and the driven member, transmission devices having gears mounted independently of said driving member and permanently in mesh with the respective gears of said rotatable member, devices to separately connect any one of said transmission devices with said driving member, and power operated mechanism to control the operation of said connecting devices.

14. The combination, with a driving member, and a driven member, of a rotatable member, a connection between said rotatable member and said driven member, transmission devices to connect said rotatable member with said driving member and each comprising a clutch, and automatic mechanism to move the clutches of all of said transmission devices into inoperative positions and to move a selected one of said clutches into operative position.

15. The combination, with a driving member, and a driven member, of a rotatable member, a connection between said rotatable member and said driven member, transmission devices to connect said rotatable member with said driving member and each comprising a clutch, automatic mechanism to move the clutches of all of said transmission devices into inoperative positions and to move a selected one of said clutches into operative position, and means under the control of the operator for selecting the clutch which is to be moved into operative position.

16. The combination, with a driving member, and a driven member, of a rotatable member, a clutch to connect said rotatable member with said driven member, transmission devices to connect said rotatable member with the driving member and each comprising a clutch, of means to operate the first-mentioned clutch to disconnect said rotatable member from said driven member, to automatically actuate the clutch of a selected transmission device to connect that transmission device with said driving member and to restore the connection between said rotatable member and said driven member.

17. The combination, with a driving member, and a driven member, of a rotatable member, a clutch to connect said rotatable member with said driven member, transmission devices to connect said rotatable member with the driving member and each comprising a clutch, of means to operate the first-mentioned clutch to disconnect said rotatable member from said driven member, to automatically actuate the clutch of a selected transmission device to connect that transmission device with said driving member, means to gradually increase the speed of said driven member until it equals the speed of said rotatable member and to automatically actuate the clutch of said rotatable member to positively connect that member with the driven member.

18. The combination, with a driving member, a driven member, connecting devices for said members comprising a rotatable member, a clutch connection between said rotatable member and said driven member, and transmission devices to connect said rotatable member with said driving member and each comprising a clutch, of means to interrupt the positive connection between said rotatable member and said driven member and to automatically actuate one of said clutches to connect the corresponding transmission device with said driving member, a yielding connection between said rotatable member and said driven member having adjustable means for controlling the same, means controlled by said rotatable member to actuate said adjusting means, and means to automatically restore the positive connection between said rotatable member and said driven member.

19. The combination, with a driving member, a driven member, connecting devices for said members comprising a rotatable member, a clutch connection between said rotatable member and said driven member, transmission devices to connect said rotatable member with said driving member and each comprising a clutch, and means to interrupt the positive connection between said rotatable member and said driven member and to automatically actuate one of said clutches to connect the corresponding transmission device with said driving member, of a yielding connection between said rotatable member and said driven member comprising fluid-controlled devices, a valve to control the flow of fluid to and from said devices, and means to restore the positive connection between said rotatable member and said driven member when the flow of fluid to and from said fluid-controlled devices has been completely interrupted.

20. The combination, with a driving member, and a driven member, of a rotatable member comprising a plurality of gears, a connection between said gears and said driven member, separately mounted transmission devices having gears permanently in mesh with the respective gears of said rotatable member, devices to separately connect a selected one of said transmission devices with said driving member, and power operated mechanism to control the operation of said connecting devices.

21. The combination, with a driving member, and a driven member, of a rotatable member comprising a plurality of gears, a connection between said gears and said driven member, separately mounted transmission devices having gears permanently in mesh with the respective gears of said rotatable member, a controlling device, and mechanism controlled by said device to disconnect said rotatable member from said driven member and to connect a selected one of said transmission devices with said driving member.

22. The combination, with a driving member and a driven member, of a rotatable member comprising a plurality of gears, a connection between said gears and said driven member, separately mounted transmission devices having gears permanently in mesh with the respective gears of said rotatable member, devices to respectively connect a selected one of said transmission devices with said driving member, power operated mechanism to first disconnect all of said transmission devices from said driving member and then connect a selected one of said transmission devices with said driving member, and a single device to cause said rotatable member to be disconnected from said driven member and to cause the operation of said power operated mechanism.

23. The combination, with a driving member and a driven member, of a rotatable member comprising a plurality of gears, a connection between said gears and said driven member, separately mounted transmission devices having gears permanently in mesh with the respective gears of said rotatable member, devices to respectively connect a selected one of said transmission devices with said driving member, power operated mechanism to first disconnect all of said transmission devices from said driving member and then connect a selected one of said transmission devices with said driving member, and mechanism, a single operation of which will cause said rotatable member to be disconnected from said drived member and will cause the operation of said power operated mechanism.

24. The combination, with a driving member and a driven member, of a connecting mechanism for said members comprising a plurality of transmission devices, and a main clutch interposed between said transmission devices and one of said members, each transmission device having a separate clutch mechanism to connect it with the other of said members, individual actuating devices for the respective clutch mechanisms, selective means to control the operation of said actuating devices, and a device, a single operation of which will cause the operation of said main clutch and a selected one of said actuating devices.

25. The combination, with a driving member and a driven member, of a connecting mechanism for said members comprising a plurality of transmission devices, and a main clutch interposed between said transmission devices and one of said members, each transmission device having a separate clutch mechanism to connect it with the other of said members, individual actuating devices for the respective clutch mechanisms, selective means to control the operation of said actuating devices, automatically operated mechanism to cause the operation of a selected one of said actuating devices, and a single device to cause the operation of said main clutch and to control said automatic mechanism.

26. The combination, with a driving member, and a driven member, of a connecting mechanism for said members comprising a plurality of transmission devices connected with one of said members and each having a separate clutch mechanism, and means to automatically disconnect all of said transmission devices from the other member and to actuate a selected one of said clutch mechanisms to connect the corresponding one of said transmission devices with said other member.

27. The combination, with a driving member and a driven member, and a connecting mechanism for said members comprising a main clutch and separately mounted transmission devices each having a clutch mechanism, of individual actuating devices to control the movements of the respective clutch mechanisms, a selective device to control the movements of said actuating devices, means to adjust said selecting device, and a single device to cause the operation of said main clutch and said actuating devices.

28. The combination, with a driving member and a driven member, and a connecting mechanism for said members comprising a main clutch and a plurality of transmission devices each having a clutch mechanism, of individual actuating devices to control the movements of the respective clutch mechanisms, a selective device to control the movements of said actuating devices, means to adjust said selecting device, a single device to cause the operation of said main clutch and said actuating devices, and means to automatically restore the connection between said members.

29. The combination, with a driving member, a driven member, and connecting mechanism for said members comprising a plurality of transmission devices each having a clutch mechanism, of individual actuating members to control the respective clutch mechanisms, and automatic means to engage said actuating members to move all of said clutch mechanisms into inoperative positions, a selector arranged in the path of said actuating members to control the movement of said clutch members toward their operative positions, and means to adjust said selector.

30. The combination, with a driving member, a driven member, and connecting mechanism for said members comprising a plurality of transmission devices each having a clutch mechanism, of individual actuating members to control the movements of the respective clutch members, a selector comprising a movable member having a groove to receive the end of any one of said actuating members, and means to move said selector to bring said groove into alinement with a selected one of said actuating members.

31. The combination, with a driving member, a driven member, and connecting mechanism for said members comprising a plurality of transmission devices each having a spring-actuated clutch mechanism, of individual actuating levers for controlling the respective clutch mechanisms, a selector comprising a rotatable member arranged in the paths of the inner ends of said actuating levers to hold said levers in a position to retain the clutch mechanisms in inoperative positions, said rotatable member having a groove adapted to be brought into alinement with the end of any one of said levers, whereby that lever alone is released to permit its clutch mechanism to be moved into operative position.

32. The combination, with a driving member, a driven member, and connecting mechanism for said members comprising a plurality of transmission devices each having a spring-actuated clutch mechanism, of individual actuating levers for controlling the respective clutch mechanisms, a selector comprising a rotatable member arranged in the paths of the inner ends of said actuating levers to hold said levers in a position to retain the clutch mechanisms in inoperative positions, said rotatable member having a groove adapted to be brought into alinement with the end of one of said levers, whereby that lever alone is released to permit its clutch mechanism to be moved into operative position, and means whereby said actuating lever may be disengaged from the groove in said selector, to permit the latter to be adjusted, without moving its clutch mechanism into an inoperative position.

33. The combination, with a driving member, a driven member, and connecting mechanism for said members comprising a plurality of transmission devices each having a spring-actuated clutch mechanism, of a selector comprising a rotatable member having a groove, an individual actuating lever for each of said transmission devices, each of said levers being mounted for pivotal and sliding movement and having its inner end arranged adjacent to and in alinement with said rotatable member, means for adjusting said rotatable member to bring said groove into alinement with the end of a selected lever and for imparting sliding movement to said lever to move the end of the same into a position to enter said groove.

34. The combination, with a driving member, a driven member, and connecting mechanism for said members comprising a plurality of transmission devices each having a spring-actuated clutch mechanism, of a selector comprising a rotatable collar provided with a groove in the periphery thereof having flared side walls, actuating members for the respective transmission devices mounted for both swinging and sliding movements and having end portions adapted to enter the groove in said collar to permit the respective clutch mechanisms to be moved into operative positions, whereby when one of said levers has entered said groove said lever may be disengaged from the groove without rendering its clutch mechanism inoperative.

35. The combination, with a driving member, a driven member, and connecting mechanism for said members comprising a plurality of transmission devices each having a spring-actuated clutch mechanism, of actuating members to control the respective clutch mechanisms, a positively actuated device to engage said actuating members and move the respective clutch mechanisms into inoperative positions, a selector to permit a single actuating member to move its clutch into operative position, means to disconnect said driven member from said driving member before said clutch mechanisms are rendered inoperative, and means to automatically restore said connection after said single clutch has been moved into its operative position.

36. The combination, with a driving member, a driven member, and connecting mechanism for said members comprising a plurality of transmission devices each having a spring actuated clutch mechanism, of a motor, a shaft, individual actuating members to control the respective clutch mechanisms, said actuating members being grouped about said shaft, a selector to control the movements of said actuating members, and a clearing device slidably mounted on said shaft and adapted to be actuated by said motor to engage said actuating members and disconnect all of said clutch mechanisms.

37. The combination, with a driving member, a driven member, and connecting mechanism for said members comprising a plurality of transmission devices each having a spring-actuated clutch mechanism, of a motor, a shaft adapted to be rotated by said motor, individual actuating members to control the respective clutch mechanisms, said actuating members being grouped about said shaft, a clearing device slidably mounted on said shaft adapted to engage the respective actuating members, and means controlled by the rotation of said shaft to impart sliding movement to said clearing device.

38. The combination, with a driving member, a driven member, and connecting mechanism for said members comprising a plurality of transmission devices each having a spring-actuated clutch mechanism, of a supporting frame having a hollow trunnion, a shaft journaled in said trunnion, a gear rigidly secured to said shaft, a plurality of spring-actuated gears arranged about and meshing with the first-mentioned gear, means to control the movements of said spring-actuated gears, a clearing device slidably mounted on said shaft and held against rotation relatively thereto, said clearing device and said trunnion having coöperating parts adapted to impart movement to said clearing device longitudinally of said shaft when relative movement is imparted to said trunnion and said shaft, and individual actuating members for the respective clutch mechanisms arranged to be engaged by said clearing device when said longitudinal movement is imparted thereto.

39. The combination, with a driving member, a driven member, and connecting mechanism for said members comprising a plurality of transmission devices each having a spring-actuated clutch mechanism, of a supporting frame connected to said driving member and having a hollow trunnion, a shaft journaled in said hollow trunnion and having a gear secured thereto within said frame, a plurality of spring-actuated gears meshing with the gear on said shaft, locking devices to control the movements of said spring-actuated gears whereby said shaft and said frame may be caused to rotate in unison or one of said parts may be caused to rotate relatively to the other, a clearing device, means actuated by the relative rotation of said frame and said shaft for imparting movement to said clearing device, and actuating members for controlling the respective clutch mechanism adapted to be actuated by said clearing device.

40. The combination, with a driving member, a driven member, and connecting mechanism for said members comprising a plurality of transmission devices each having a spring-actuated clutch mechanism, of individual actuating members to control the respective clutch mechanisms, a selector to control the movement of said actuating devices in a direction to permit the clutch mechanisms to move into operative positions, said selector having a groove to receive a part of one of said actuating members, a clearing device to operate said actuating members to move all said clutch mechanisms into inoperative positions and move one of said actuating devices into a position to enter said groove, a supporting frame connected to and rotating with said driving member having a hollow trunnion, a shaft journaled in said trunnion and having a gear, a plurality of spring-actuated gears carried by said frame and meshing with the first-mentioned gear, locking devices to control said spring-actuated gears to cause said shaft and said supporting frame to rotate in unison or to rotate relatively one to the other, means actuated by the relative movement of said frame and said shaft to impart operative movement to said clearing device, and means under the control of the operator for adjusting said selector and releasing said locking devices to cause the relative movement of said supporting frame and said shaft.

41. The combination, with a driving member, a driven member, and connecting mechanism for said members comprising a plurality of transmission devices each having a spring-actuated clutch mechanism, or actuating members to control the respective clutch mechanisms, a clearing device arranged to impart movement to said actuating members, a supporting frame connected to and rotatable with the driving member and having a hollow trunnion, a shaft journaled in said trunnion and normally rotating in unison with said supporting frame, means for imparting relative movement to said frame and said shaft, and means actuated by said relative movement to actuate said clearing device.

42. The combination, with a driving member, a driven member, and connecting mechanism for said members comprising a plurality of transmission devices each having a spring-actuated clutch mechanism, of individual actuating members to control the respective clutch mechanisms, a selector to control the movement of said actuating devices in a direction to permit the clutch mechanisms to move into operative positions, said selector having a groove to receive a part of one of said actuating members, a clearing device to operate said actuating members to move all of said clutch mechanisms into inoperative positions and move one of said actuating devices into a position to enter said groove, a supporting frame connected to and rotating with said driving member and having a hollow trunnion, a shaft journaled in said trunnion and having a gear, a plurality of spring-actuated gears carried by said frame and meshing with the first-mentioned gear, locking devices to control said spring-actuated gears to cause said shaft and said supporting frame to rotate in unison or to rotate relatively one to the other, means actuated by the relative movement of said frame and said shaft to impart operative movement to said clearing device, means under the control of the operator for adjusting said selector and releasing said locking devices to cause the relative movement of said supporting frame and said shaft, and automatically controlled means for rewinding the springs of said spring-actuated gears.

43. The combination, with a driving member, a driven member, and connecting mechanism for said members comprising a plurality of transmission devices each having a spring-actuated clutch mechanism, of actuating members for controlling the respective clutch mechanisms, a clearing device to engage said actuating members and move said clutch members into inoperative positions, a spring-actuated motor to impart movement to said clearing device, and automatically controlled means for rewinding th spring of said motor.

44. The combination, with a driving member, and a driven member, of a connecting mechanism for said members comprising a rotatable member, transmission devices to connect said rotatable member with said driving member and each comprising a clutch mechanism, means to manipulate said clutch mechanisms to render a selected one of said transmission devices operative, a clutch to positively connect said rotatable member with said driven member, a yielding connection between said rotatable member and said driven member having automatically actuated means to gradually increase the speed of the driven member to the speed of the rotatable member, and means for rendering said clutch inoperative during the operation of said yielding connection.

45. The combination, with a driving member, and a driven member, of a connecting mechanism for said members comprising a rotatable member, transmission devices to connect said rotatable member with said driving member and each comprising a clutch, means to manipulate said clutch mechanisms to render a selected one of said transmission devices operative, a clutch to positively connect said rotatable member with said driven member, a yielding connection interposed between said rotatable member and said driven member and adapted to resist the rotation of said rotatable member relatively to said driven member, an automatically actuated device to gradually increase said resistance, and means controlled in unison with said automatically actuated device to retain said clutch in an inoperative position during the operation of said device and to release said clutch when said resistance has been increased to the maximum amount.

46. The combination, with a driving member, and a driven member, of a connecting mechanism for said members comprising a rotatable member, transmission devices to connect said rotatable member with said driving member and each comprising a clutch, means to manipulate said clutch mechanisms to render a selected one of said transmission devices operative, a clutch to positively connect said rotatable member with said driven member, a yielding connection interposed between said rotatable member and said driven member and comprising fluid cylinders carried by said driven member, pistons mounted in said cylinders and operatively connected with said rotatable member, whereby the rotation of the latter will cause said pistons to reciprocate in their respective cylinders, a valve to control the flow of fluid to and from said cylinders, an actuating device to gradually close said valve, and a detent to retain said clutch in an inoperative position during the operation of said valve.

47. The combination, with a driving member, and a driven member, of a connecting mechanism for said members comprising a rotatable member, transmission devices to connect said rotatable member with said driving member and each comprising a clutch, means to manipulate said clutch mechanisms to render a selected one of said transmission devices operative, a clutch to positively connect said rotatable member with said driven member, a yielding connection interposed between said rotatable member and said driven member and comprising fluid cylinders carried by said driven member, pistons mounted in said cylinders and operatively connected with said rotatable member, whereby the rotation of the latter will cause said pistons to reciprocate in their respective cylinders, a valve to control the flow of fluid to and from said cylinders, a detent to retain said clutch in an inoperative position, and automatically actuated devices to gradually close said valve and to release said clutch when said valve has been closed.

48. The combination, with a driving member, and a driven member, of a connecting mechanism for said members comprising a rotatable member, transmission devices to connect said rotatable member with said driving member and each comprising a clutch, means to manipulate said clutch mechanisms to render a selected one of said transmission devices operative, a clutch to positively connect said rotatable member with said driven member, a yielding connection interposed between said rotatable member and said driven member and comprising fluid cylinders carried by said driven member, pistons mounted in said cylinders and operatively connected with said rotatable member, whereby the rotation of the latter will cause said pistons to reciprocate in their respective cylinders, a valve to control the flow of fluid to and from said cylinders, a detent to retain said clutch in inoperative position, an arm connected with said valve and with said detent, a rotatable cam arranged to engage said arm, and means actuated by the rotation of said rotatable member to operate said cam to move said arm and gradually close said valve and to move said detent into an inoperative position with relation to said clutch.

49. The combination, with a driving member, and a driven member, of a connecting mechanism for said members comprising a rotatable member, transmission devices to connect said rotatable member with said driving member and each comprising a clutch, means to manipulate said clutch mechanisms to render a selected one of said transmission devices operative, a clutch to positively connect said rotatable member with said driven member, a yielding connection interposed between said rotatable member and said driven member and comprising fluid cylinders carried by said driven member, pistons mounted in said cylinders and operatively connected with said rotatable member, whereby the rotation of the latter will cause said pistons to reciprocate in their respective cylinders, a valve to control the flow of fluid to and from said cylinders, a detent, means to move said clutch into an inoperative position, to move said valve into its open position and to cause said detent to engage said clutch, and a cam actuated by said rotatable member to close said valve and move said detent into an inoperative position.

50. In a mechanism of the character described, the combination, with a plurality of clutches, means for actuating said clutches, a selector to control the operation of said clutches, and a clearing device to render said clutches inoperative, of a driving member, a frame connected to and rotating with said driving member, a motor carried by said frame, and means actuated by said motor for operating said clearing device.

51. In a mechanism of the character described, the combination, with a driving member, and a driven member, connecting mechanism comprising a rotatable member, a clutch to connect said rotatable member with the driven member, transmission devices to connect said rotatable member with the driving member and each having a clutch mechanism, and devices to manipulate said clutch mechanism to render a selected one of said transmission devices operative, of a spring-actuated motor operatively connected with said actuating devices to control said clutch mechanism, a locking device to hold said spring motor against operation, an actuating device, the movement of which in one direction will move the clutch between said rotatable member and said driven member into inoperative position and the movement of which in the other direction will release said locking devices and permit said spring motor to operate.

52. In a mechanism of the character described, the combination, with a driving member, and a driven member, connecting mechanism comprising a rotatable member, a clutch to connect said rotatable member with the driven member, transmission devices to connect said rotatable member with the driving member and each having a clutch mechanism, and actuating devices to manipulate said clutch mechanism to render a selected one of said transmission devices operative, of a spring-actuated motor operatively connected with said actuating devices to control said clutch mechanism and comprising a gear, a spring operatively connected therewith, locking devices to control the movement of said gear, said locking devices comprising a movable member and being so constructed and arranged that said gear will be released only on the second movement of said movable member, and a device arranged to actuate said movable member and to disengage the clutch which connects said rotatable member with said driven member.

53. In a mechanism of the character described, the combination, with a driving member, and a driven member, connecting mechanism comprising a rotatable member, a clutch to connect said rotatable member with the driven member, transmission devices to connect said rotatable member with the driving member and each having a clutch mechanism, and actuating devices to manipulate said clutch mechanism to render a selected one of said transmission devices operative, of a spring motor operatively connected with said actuating devices comprising a gear having a flange provided with a notch and having one end thereof turned inward, a spring to actuate said gear, a dog slidably mounted in said notch and having a coöperating notch adapted to receive the end of said flange, said notch being so arranged with relation to the inturned end of said flange that when it is brought into alinement therewith the inturned end of the flange will engage the wall of the notch and will be held against movement until the dog moves inward, a device for imparting outward movement to said dog, and means for actuating said device, said actuating means being connected with the clutch which is interposed between said rotatable member and said driven member whereby the first movement of said actuating means will disengage said clutch and impart an outward movement to said dog and when said device is released said dog will be moved inward to permit said flange to enter the notch therein and said gear to rotate.

54. In a device of the character described, an engine shaft, a frame connected to and rotating with said shaft and having a hollow trunnion, a shaft journaled in said hollow trunnion, transmission mechanism controlled by the rotation of said shaft relatively to said trunnion, a gear rigidly secured to said shaft, spring-actuated gears mounted on said frame and meshing with the first-mentioned gear, locking devices to control the movement of said spring-actuated gears, and means to control the rotation of said shaft by said spring-actuated gears, whereby the rotation of said gears may cause said frame to move relatively to said last-mentioned shaft or may cause said shaft to move relatively to said frame.

55. In a device of the character described, an engine shaft, a frame connected to and rotating with said engine shaft, a second shaft, a gear rigidly secured to said second shaft, spring-actuated gears mounted on said frame and meshing with the gear on said second shaft, means to control the operation of said spring-actuated gears, and means to control the rotation of said second shaft, whereby the operation of said spring-actuated gears when said second shaft is held against rotation will impart movement to said frame and said engine shaft, and when said second shaft is free to rotate will move said shaft relatively to said frame.

56. In a device of the character described, an engine shaft, a frame connected to and rotating with said engine shaft, a second shaft, a gear rigidly secured to said second shaft, spring-actuated gears mounted on said frame and meshing with the gear on said second shaft, means to control the operation of said spring-actuated gears, means to control the rotation of said second shaft, whereby the operation of said spring-actuated gears when said second shaft is held against rotation will impart movement to said frame and said engine shaft, and when said second shaft is free to rotate will move said shaft relatively to said frame, and transmission devices controlled by the rotation of said shaft relatively to said frame.

57. In a device of the character described, an engine shaft, a frame connected to and rotating with said engine shaft and having a hollow trunnion, a shaft journaled in said hollow trunnion, a gear rigidly secured to said shaft, spring-actuated gears mounted on said frame and meshing with the first-mentioned gear, devices to control the movement of said spring-actuated gears, operable clutch mechanism to control the rotation of said last-mentioned shaft, and transmission devices controlled by the movement of said last-mentioned shaft relatively to said hollow trunnion.

In testimony whereof, I affix my signature in presence of two witnesses.

VICTOR E. RUMBARGER.

Witnesses:
F. W. SCHAEFER,
H. L. HAMMAKER.